United States Patent
Chang et al.

(10) Patent No.: US 8,483,116 B2
(45) Date of Patent: Jul. 9, 2013

(54) APPARATUS AND METHOD FOR TRANSMITTING CONTROL MESSAGE IN MULTIHOP RELAY WIRELESS COMMUNICATION SYSTEM

(75) Inventors: Young-Bin Chang, Anyang-si (KR); Taori Rakesh, Suwon-si (KR); Jung-Je Son, Seongnam-si (KR); Chang-Yoon Oh, Yongin-si (KR); Hyoung-Kyu Lim, Seoul (KR); Sung-Jin Lee, Seoul (KR); Hyun-Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 1049 days.

(21) Appl. No.: 12/062,137

(22) Filed: Apr. 3, 2008

(65) Prior Publication Data
US 2008/0248793 A1 Oct. 9, 2008

(30) Foreign Application Priority Data

Apr. 3, 2007 (KR) ........................ 10-2007-0032983
Sep. 8, 2007 (KR) ........................ 10-2007-0091258

(51) Int. Cl.
*H04W 88/04* (2009.01)
(52) U.S. Cl.
USPC ........... 370/315; 370/226; 370/243; 370/246; 370/274; 370/279; 370/492; 370/501; 455/11.1; 455/13.1; 455/16
(58) Field of Classification Search
USPC ................ 370/315, 226, 243, 246, 274, 279, 370/492, 501; 455/7, 11.1, 13.1, 16
See application file for complete search history.

(56) References Cited

U.S. PATENT DOCUMENTS

| | | | |
|---|---|---|---|
| 2006/0153132 A1 | 7/2006 | Saito | |
| 2007/0147308 A1* | 6/2007 | Hart | 370/332 |
| 2008/0285499 A1* | 11/2008 | Zhang et al. | 370/315 |
| 2009/0017814 A1* | 1/2009 | Horiuchi et al. | 455/422.1 |

FOREIGN PATENT DOCUMENTS

| | | |
|---|---|---|
| CN | 101166055 | 4/2008 |
| EP | 1 361 689 | 9/2007 |
| GB | 2 417 862 | 3/2006 |
| JP | 2006-196985 | 7/2006 |
| WO | WO 2006/024320 | 3/2006 |
| WO | WO 2006/071049 | 7/2006 |
| WO | WO 2006/090669 | 8/2006 |
| WO | WO 2007/033613 | 3/2007 |

OTHER PUBLICATIONS

Kanchei (Ken) Loa et al., "Pipeline HARQ in Multi-hop Relay System", IEEE 802.16 Presentation Submission Template (Rev.8.3), Mar. 15, 2007.

* cited by examiner

*Primary Examiner* — Brandon Renner
*Assistant Examiner* — Abdelnabi Musa
(74) *Attorney, Agent, or Firm* — The Farrell Law Firm, P.C.

(57) ABSTRACT

An apparatus and a method for sending a control information for retransmission in a multihop relay wireless communication system are provided. Data received from a lower node is checked for errors. The data is transmitted to an upper node, when the data has no errors. When two or more information, which include at least one of Acknowledgement (ACK) and Negative ACK (NACK) in response to a data reception are received from one or more lower nodes, the two or more information are transmitted to the upper node at the same time. Accordingly, the RS can transmit the control information for the ARQ provided from the lower nodes, to the upper node at the same time.

42 Claims, 10 Drawing Sheets

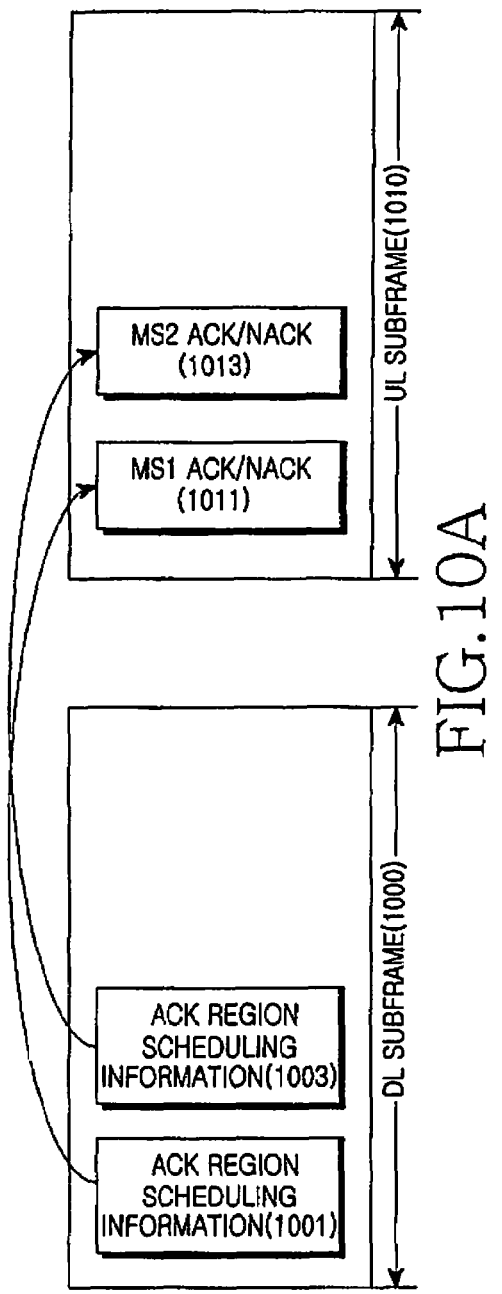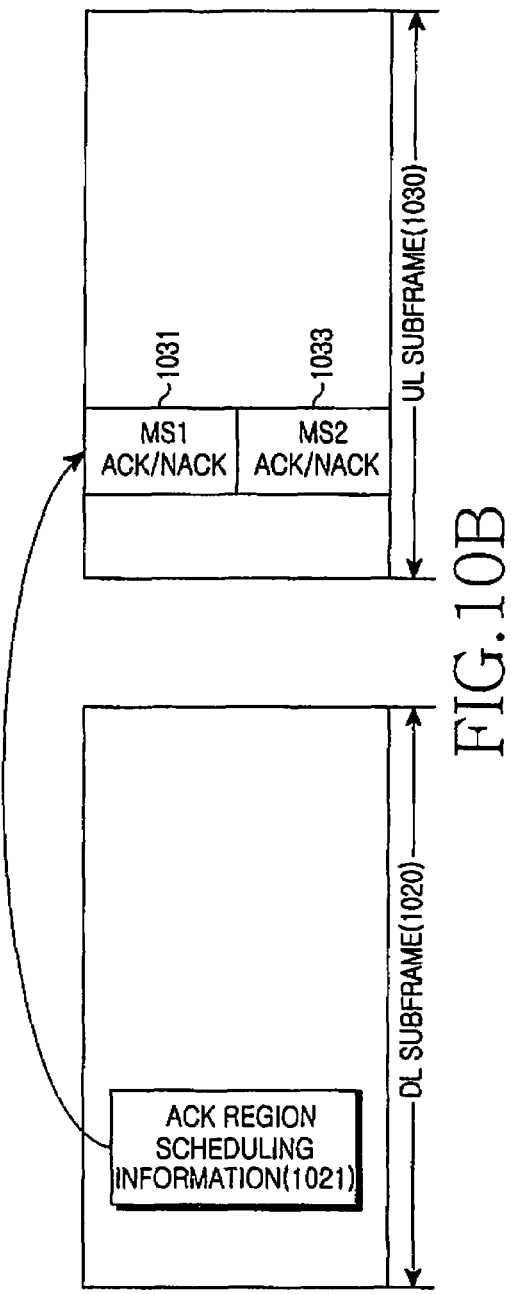

APPARATUS AND METHOD FOR TRANSMITTING CONTROL MESSAGE IN MULTIHOP RELAY WIRELESS COMMUNICATION SYSTEM

PRIORITY

This application claims priority under 35 U.S.C. §119(a) to a Korean patent application filed in the Korean Intellectual Property Office on Apr. 3, 2007 and assigned Serial No. 2007-32983 and a Korean patent application filed in the Korean Intellectual Property Office on Sep. 8, 2007 and assigned Serial No. 2007-91258, the entire disclosures of which are incorporated herein by reference.

BACKGROUND OF THE INVENTION

1. Field of the Invention

The present invention relates generally to an apparatus and a method for an Automatic Retransmission reQuest (ARQ) in a wireless communication system, and more particularly, to an apparatus and a method for sending a control message for the ARQ in a multihop relay wireless communication system.

2. Description of the Related Art

In a wireless communication system, specific data may be corrupted according to a channel condition of a radio resource of the data. Error controlling and correcting methods largely include an Automatic Retransmission reQuest (ARQ) and a Forward Error Check (FEC). According to the ARQ, a receiver requests a transmitter to retransmit the corrupted data. The FEC scheme corrects errors in the compromised data at the receiver.

When the wireless communication system adopts the ARQ scheme, the receiver checks for errors by decoding the received packets. When the received packets are free from error, the receiver sends an Acknowledgement (ACK) message to the transmitter.

When errors are detected in the received packets, the receiver sends a Negative ACK (NACK) message to the transmitter.

Upon receiving the ACK message from the receiver, the transmitter transmits new packets. Upon receiving the NACK message from the receiver, the transmitter retransmits the previous packets to the receiver.

Recently, the wireless communication system provides a relay service using a relay station to provide a better radio channel to a mobile station, which travels in a cell boundary or in a shadow area. That is, the wireless relay communication system can provide a better radio channel between a base station and a mobile station by relaying data between the base station and the mobile station using the relay station.

Thus, the wireless relay communication system requires an ARQ method using the relay station.

SUMMARY OF THE INVENTION

The present invention has been made to address at least the above-mentioned problems and/or disadvantages and to provide at least the advantages described below. Accordingly, an aspect of the present invention provides an apparatus and a method for sending a multi-control message for an ARQ in a multihop relay wireless communication system.

Another aspect of the present invention provides an apparatus and a method for allocating a channel of a multi-control message sent for an ARQ in a multihop relay wireless communication system.

An additional aspect of the present invention provides an apparatus and a method for allocating a control channel of a multi-ACK/NACK sent for an ARQ in a multihop relay wireless communication system.

The above aspects are achieved by providing an operating method of a Relay Station (RS) in a wireless relay communication system is provided. Data received from a upper node is checked for error. The data is transmitted to an upper node, when the data has no error. When two or more message, which are Acknowledgement (ACK) messages and/or Negative ACK (NACK) message in response to a data reception are received from one or more lower nodes, transmitting the message to the upper node at the same time.

According to one aspect of the present invention, an operating method of an RS in a wireless relay communication system is provided. Data received from a lower node is checked for errors. The data is transmitted to an upper node, when the data has no errors. When two or more messages, which are Acknowledgement (ACK) messages and/or Negative ACK (NACK) messages, are received from one or more lower nodes in response to a reception of data from a second lower node, the messages are transmitted to the upper node at the same time.

According to another aspect of the present invention, an operating method of an upper node in a wireless relay communication system is provided. A control channel for receiving messages is allocated that is indicative of errors of one or more lower nodes from a lower RS. Allocation information of the control channel is transmitted to the lower RS.

According to an additional aspect of the present invention, an RS in a wireless relay communication system is provided. The system includes a receiver for receiving data and a message indicative of errors from a lower node. The system also includes a checker for checking error of the received data, and a transmitter for transmitting error-free data. The transmitter also transmits two or more messages, which are Acknowledgement (ACK) messages and/or Negative ACK (NACK) messages, in response reception to an upper node at the same time when the messages are received from one or more lower nodes.

BRIEF DESCRIPTION OF THE DRAWINGS

The above and other aspects, features and advantages of the present invention will become more apparent from the following detailed description when taken in conjunction with the accompanying drawings, in which:

FIGS. 10A and 10B are diagrams illustrating frame structures for carrying ACK/NACK scheduling information for the DL data in the multihop relay wireless communication system according to an embodiment of the present invention.

DETAILED DESCRIPTION OF PREFERRED EMBODIMENTS

Preferred embodiments of the present invention are described in detail below with reference to the accompanying drawings. Detailed descriptions of constructions or processes known in the art may be omitted to avoid obscuring the subject matter of the present invention.

The present invention provides a technique for transmitting a multi-control message for an Automatic Retransmission reQuest (ARQ) in a wireless relay communication system. While Acknowledgement (ACK)/Negative ACK (NACK) messages of the control messages are illustrated by way of example, the present invention is also applicable to other control messages.

Hereinafter, an Orthogonal Frequency Division Multiple Access (OFDMA) wireless communication system is illustrated by way of example. Note that the present invention is also applicable to other multiple access communication systems.

Figure 1:
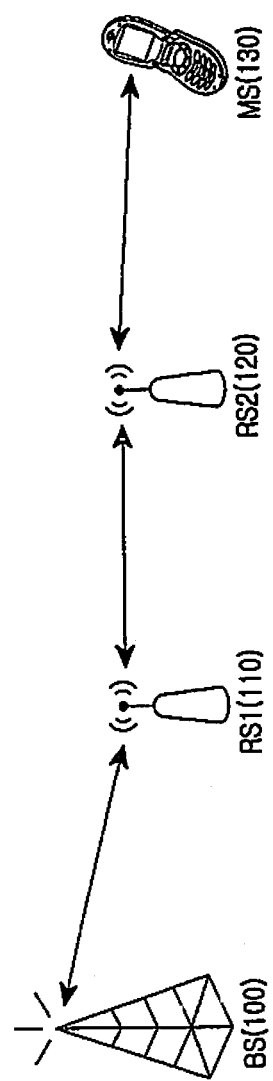
FIG. 1 is a diagram illustrating a multihop relay wireless communication system according to an embodiment of the present invention.

It is assumed that the wireless communication system includes three hops as shown in FIG. 1. Yet, the present invention is also applicable to a two-hop or multi-hop wireless communication system.

FIG. 1 is a diagram illustrating a multihop relay wireless communication system according to an embodiment of the present invention. A first Relay Station (RS) 110 indicates a one-hop RS and a second RS 120 indicates a two-hop RS.

In the wireless communication system of FIG. 1, a Base Station (BS) 100 services a Mobile Station (MS) 130 in its service coverage through a direct link. When the MS 130 travels in the outskirts of the service coverage or outside the service coverage of the BS 100, the BS 100 services the MS 130 using relay links via RSs 110 and 120.

For instance, to transmit data to the MS 130, the BS 100 transmits the data destined for the MS 130 to the first RS 110.

Receiving the data from the BS 100, the first RS 110 checks for errors in the data. For instance, the first RS 110 checks for errors using a Cyclic Redundancy Check (CRC) code of the data.

When the data is free of errors, the first RS 110 forwards the data to the second RS 120. The first RS 110 also sends an ACK message for the data to the BS 100. By contrast, when an error is detected in the data, the first RS 110 sends a NACK message of the data to the BS 100.

The first RS 110 checks whether ACK/NACK messages are received from lower nodes in a previous frame. When receiving the ACK/NACK messages from the lower nodes, the first RS 110 sends the ACK/NACK message of the data to the BS 100 together with the ACK/NACK messages from the lower nodes. Herein, the lower nodes indicate MSs in the service coverage of the first RS 110 or the second RS 120.

The second RS 120, receiving the data from the first RS 110, checks whether the data has errors. When the data is free of errors, the second RS 120 forwards the data to the MS 130. The second RS 120 sends an ACK message for the data to the first RS 110.

When an error is detected in the data, the second RS 120 sends a NACK message of the data to the first RS 110.

The second RS 120 checks whether an ACK/NACK message is received from the MS 130 in a previous frame. When receiving the ACK/NACK message from the MS 130, the second RS 120 sends the ACK/NACK message of the data to the first RS 110 together with the ACK/NACK message from the MS 130.

When receiving the data from the second RS 120, the MS 130 checks whether the data has errors. When the data is free of errors, the MS 130 sends an ACK message of the data to the second RS 120. When an error is detected in the data, the MS 130 sends a NACK message of the data to the second RS 120.

Figure 2:
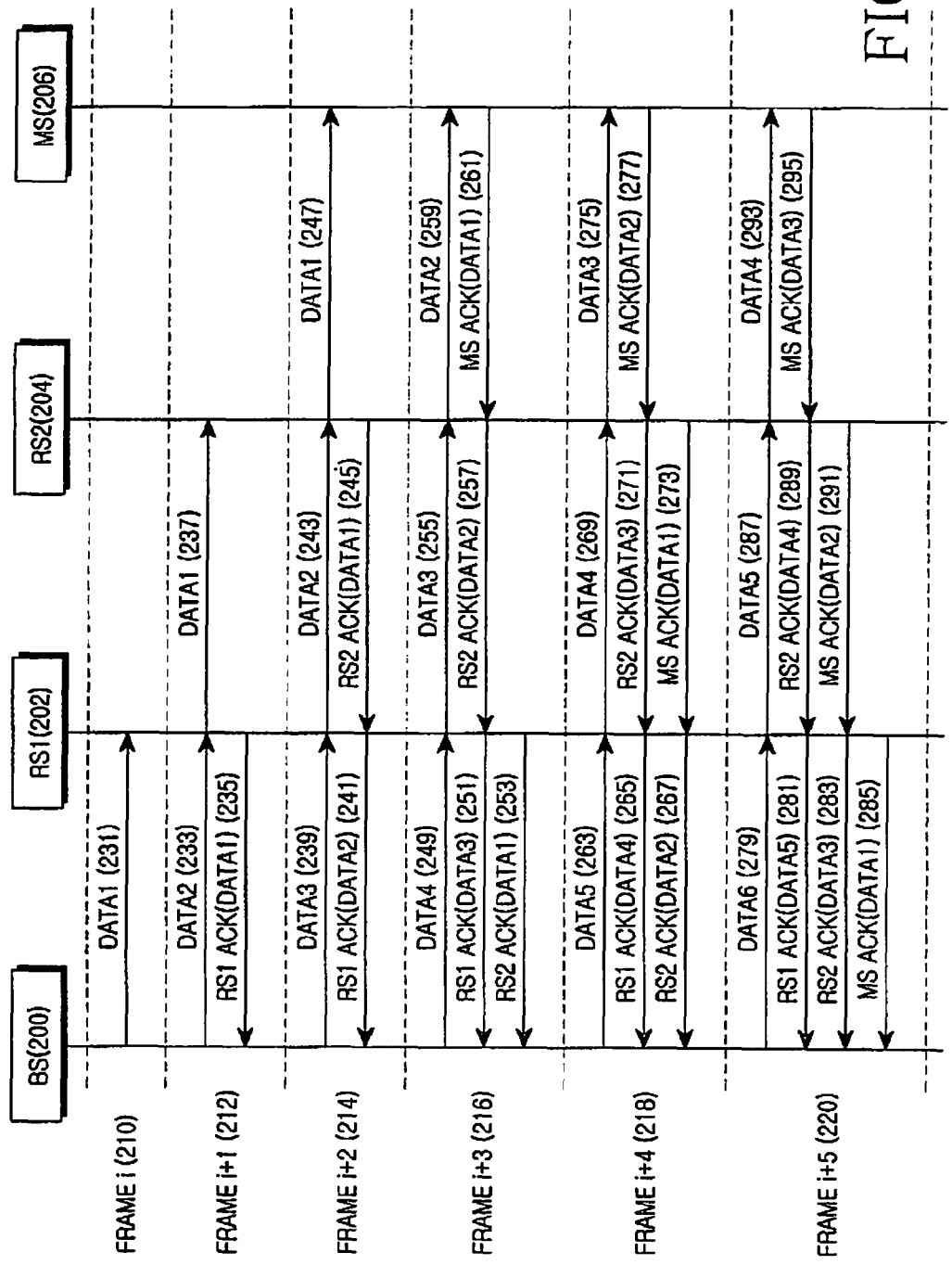
FIG. 2 is a diagram illustrating a DownLink (DL) data transmission in the multihop relay wireless communication system according to an embodiment of the present invention.
Figure 4:
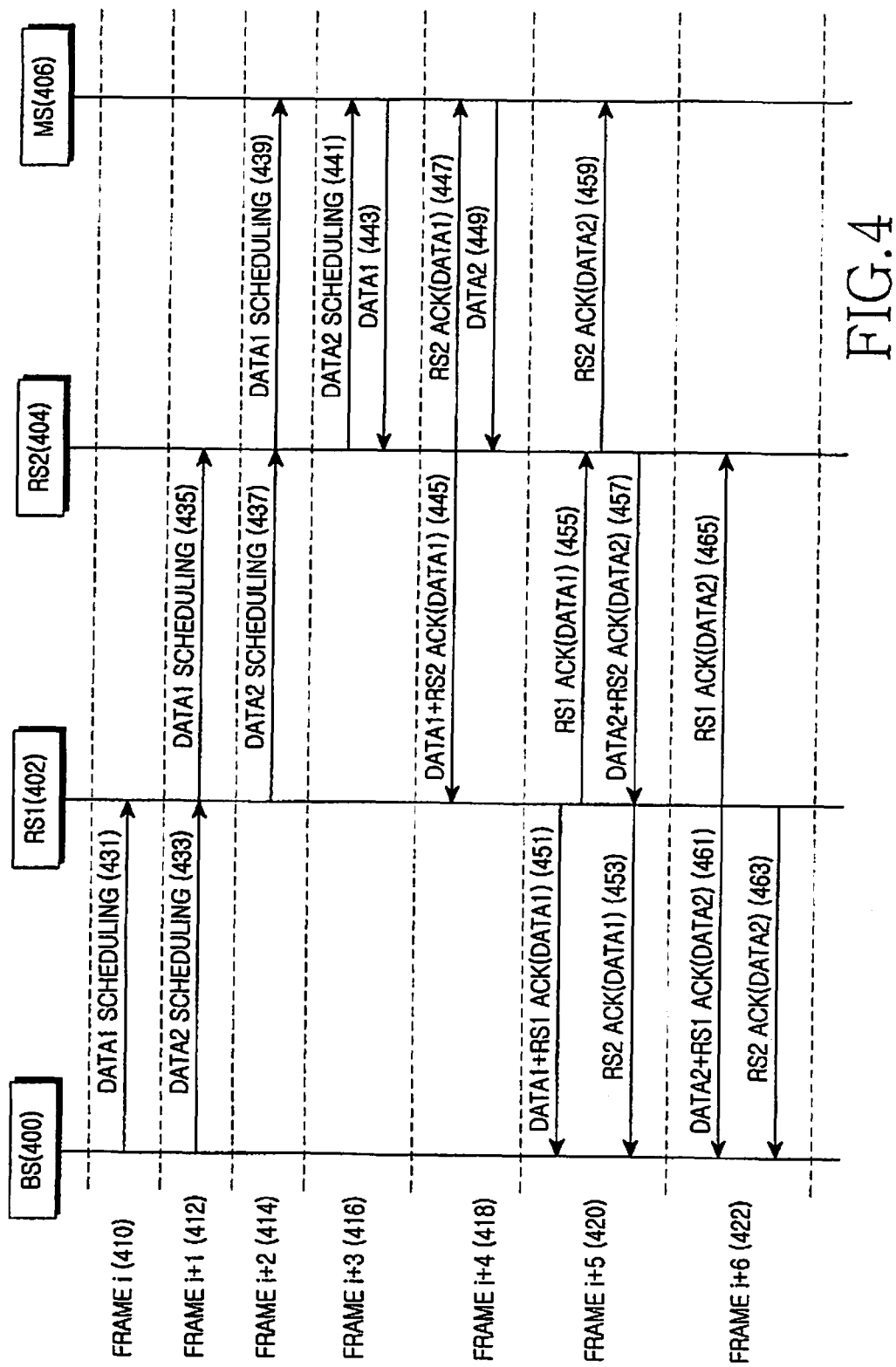
FIG. 4 is a diagram illustrating an UpLink (UL) data transmission in the multihop relay wireless communication system according to an embodiment of the present invention.

As described above, the lower nodes in the wireless communication system send the ACK/NACK message to the upper node depending on the error occurrence of the received data. For example, as for a DownLink (DL), the nodes of the wireless communication system send the ACK/NACK message to the upper node as shown in FIG. 2. As for an UpLink (UL), the nodes of the wireless communication system send the ACK/NACK message to the upper node as shown in FIG. 4. In doing so, the wireless communication system transmits and receives the data and the ACK/NACK message by a certain fundamental unit of the data transmission. Hereinafter, it is assumed that the fundamental unit of the data transmission is a frame in the wireless communication system. The frame indicates a Transmission Time Interval (TTI), which is the fundamental physical unit of the data transmission. In other words, the frame indicates the processing delay time taken for one node to receive the data, to check for errors, and to send the data and the ACK/NACK message. While it is assumed that the processing delay time is one frame, the processing delay time corresponding to the multiple frames may occur depending on the capabilities of the BS, the RS, and the MS.

The wireless communication system sends the ACK/NACK message for the DL data as shown in FIG. 2.

FIG. 2 is a diagram illustrating a DL data transmission in the multihop relay wireless communication system according to an embodiment of the present invention.

To transmit data to an MS 206, a BS 200 transmits data 1 to a first RS 202 over the i-th frame 210 in step 231. The first RS 202 checks for errors in data 1 received from the BS 200.

In step 233, the BS 200 transmits data 2 to the first RS 202 over the (i+1)-th frame 212. The first RS 202 checks for errors in data 2 received from the BS 200.

The first RS 202 sends an ACK/NACK message for data 1 to the BS 200 over the (i+1)-th frame 212.

For instance, when an error is detected in data 1, the first RS 202 sends the NACK message for the data 1 to the BS 200.

By contrast, when the data 1 has no errors, the first RS 202 sends the ACK message for data 1 to the BS 200 in step 235. The first RS 202 forwards the error-free data 1 to the second RS 204 in step 237. The second RS 204 checks for errors in data 1 received from the first RS 202.

The BS 200 transmits data 3 to the first RS 202 over the (i+2)-th frame 214 in step 239. The first RS 202 checks for errors in data 3 received from the BS 200.

Over the (i+2)-th frame 214, the first RS 202 sends an ACK/NACK message for data 2 to the BS 200.

For example, when data 2 is corrupted, the first RS 202 sends the NACK message for data 2 to the BS 200.

When data 2 has no errors, the first RS 202 sends the ACK message for data 2 to the BS 200 in step 241. The first RS 202 forwards the error-free data 2 to the second RS 204 in step 243. The second RS 204 checks for errors in data 2 received from the first RS 202.

In the (i+2)-th frame 214, the second RS 204 sends an ACK/NACK message for data 1 to the first RS 202.

For example, when an error is detected in data 1, the second RS 204 sends the NACK message for data 1 to the first RS 202.

When the data 1 has no errors, the second RS 204 sends the ACK message for data 1 to the first RS 202 in step 245. The second RS 204 forwards the error-free data 1 to the MS 206 in step 247. The MS 206 checks for errors in data 1 received from the second RS 204.

The BS 200 transmits data 4 to the first RS 202 over the (i+3)-th frame 216 in step 249. The first RS 202 checks for errors in data 4 received from the BS 200.

In the (i+3)-th frame 216, the first RS 202 sends an ACK/NACK message for data 3 to the BS 200. Together with the ACK/NACK message of data 3, the first RS 202 forwards the ACK/NACK message received from the second RS 204 over the (i+2)-th frame 214, to the BS 200 in step 253.

For example, when data 3 is corrupted, the first RS 202 sends the NACK message to the BS 200 to request the retransmission of data 3. Together with the NACK message for data 3, the first RS 202 forwards the ACK/NACK message received from the second RS 204 over the (i+2)-th frame 214, to the BS 200.

When the data 3 has no errors, the first RS 202 sends the ACK message for data 3 to the BS 200 in step 251. Together with the ACK of data 3, the first RS 202 forwards the ACK/NACK message received from the second RS 204 over the (i+2)-th frame 214, to the BS 200.

In step 255, the first RS 202 forwards the error-free data 3 to the second RS 204. The second RS 204 checks for errors in data 3 received from the first RS 202.

In the (i+3)-th frame 216, the second RS 204 sends an ACK/NACK message for data 2 to the first RS 202.

For instance, when data 2 is corrupted, the second RS 204 sends the NACK message for data 2 to the first RS 202.

When data 2 is free from error, the second RS 204 sends the ACK message for data 2 to the first RS 202 in step 257. The second RS 204 forwards the error-free data 2 to the MS 206 in step 259. The MS 206 checks for errors in data 2 received from the second RS 204.

In the (i+3)-th frame 216, the MS 206 sends an ACK/NACK message for data 1 to the second RS 204.

For example, when data 1 is corrupted, the MS 206 sends the NACK message for data 1 to the second RS 204.

When data 1 is not corrupted at all, the MS 206 sends the ACK message for data 1 to the second RS 204 in step 261.

In the (i+4)-th frame 218, the BS 200 transmits data 5 to the first RS 202 in step 263. The first RS 202 checks for errors in data 5 received from the BS 200.

The first RS 202 sends an ACK/NACK message for data 4 to the BS 200 in the (i+4)-th frame 218. Together with the ACK/NACK message for data 4, the first RS 202 forwards the ACK/NACK message received from the second RS 204 over the (i+3)-th frame 214, to the BS 200 in step 267.

For example, when data 4 is corrupted, the first RS 202 sends the NACK message for data 4 to the BS 200. Together with the NACK message for data 4, the first RS 202 forwards the ACK/NACK message received from the second RS 204 in the (i+3)-th frame 214, to the BS 200.

When data 4 is not corrupted, the first RS 202 sends the ACK message for data 4 to the BS 200 in step 265. Together with the ACK message for data 4, the first RS 202 forwards the ACK/NACK message received from the second RS 204 over the (i+3)-th frame 216, to the BS 200.

The first RS 202 forwards the error-free data 4 to the second RS 204 in step 269. The second RS 204 checks for errors in data 4 received from the first RS 202.

In the (i+4)-th frame 218, the second RS 204 sends an ACK/NACK message for data 3 to the first RS 202. Together with the ACK/NACK message for data 3, the second RS 204 forwards the ACK/NACK message received from the MS 206 over the (i+3)-th frame 216, to the first RS 202 in step 273.

For instance, when data 3 has errors, the second RS 204 sends the NACK message for data 3 to the first RS 202. Together with the NACK message for data 3, the second RS 204 forwards the ACK/NACK message received from the MS 206 over the (i+3)-th frame 216, to the first RS 202.

When the data 3 has no errors, the second RS 204 sends the ACK message for data 3 to the first RS 202 in step 271. Together with the ACK message for data 3, the second RS 204 forwards the ACK/NACK message received from the MS 206 over the (i+3)-th frame 216, to the first RS 202 in step 273.

The second RS 204 transmits the error-free data 3 to the MS 206 in step 275. The MS 206 checks for errors in data 3 received from the second RS 204.

Over the (i+4)-th frame 218, the MS 206 sends an ACK/NACK message for data 2 to the second RS 204. For example, when data 2 is corrupted, the MS 206 sends the NACK message for data 2 to the second RS 204.

When data 2 is not corrupted, the MS 206 sends the ACK message for data 2 to the second RS 204 in step 277.

The BS 200 transmits data 6 to the first RS 202 over the (i+5)-th frame 220 in step 279. The first RS 202 checks for errors in data 6 received from the BS 200.

Over the (i+5)-th frame 220, the first RS 202 sends an ACK/NACK message for data 5 to the BS 200. Together with the ACK/NACK message for data 5, the first RS 202 forwards the ACK/NACK message for data 3 from the second RS 204 over the (i+4)-th frame 218 and the ACK/NACK message for data 1 from the MS 206, to the BS 200 in steps 283 and 285.

For example, when an error is detected in data 5, the first RS 202 sends the NACK message for data 5 to the BS 200. Together with the NACK message for data 5, the first RS 202 forwards the ACK/NACK message for data 3 from the second RS 204 over the (i+4)-th frame 218 and the ACK/NACK message for data 1 from the MS 206, to the BS 200.

When no errors are detected in data 5, the first RS 202 sends the ACK message for data 5 to the BS 200 in step 281. Together with the ACK message for data 5, the first RS 202 forwards the ACK/NACK message for data 3 from the second RS 204 over the (i+4)-th frame 218 and the ACK/NACK message for data 1 from the MS 206, to the BS 200.

The first RS 202 transmits the error-free data 5 to the second RS 204 in step 287. The second RS 204 checks for errors in data 5 received from the first RS 202.

Over the (i+5)-th frame 220, the second RS 204 sends an ACK/NACK message for data 4 to the first RS 202. Together with the ACK/NACK message for data 4, the second RS 204 forwards the ACK/NACK message received from the MS 206 over the (i+4)-th frame 218, to the first RS 202 in step 291.

For example, when data 4 is corrupted, the second RS 204 sends the NACK message for data 4 to the first RS 202. The second RS 204 sends the ACK/NACK message received from the MS 206 over the (i+4)-th frame 218, to the first RS 202 together with the NACK message for data 4.

When data 4 has no errors, the second RS 204 sends the ACK message for data 4 to the first RS 202 in step 289. Together with the ACK message for data 4, the second RS 204 forwards the ACK/NACK message received from the MS 206 over the (i+4)-th frame 218, to the first RS 202.

The second RS 204 forwards the error-free data 4 to the MS 206 in step 293. The MS 206 checks for errors in data 4 received from the second RS 204.

Over the (i+5)-th frame 220, the MS 206 sends an ACK/NACK message for data 3 to the second RS 204. For instance, when data 3 is corrupted, the MS 206 sends the NACK message for data 3 to the second RS 204.

When data 3 has no errors, the MS 206 sends the ACK message for data 3 to the second RS 204 in step 295.

As described above, the first RS 202, the second RS 204, and the MS 206 of the wireless communication system forward the ACK/NACK message for the data received from the upper node, to the upper node. The first RS 202, the second RS 204, and the MS 206 send the ACK/NACK message using the resource allocated from the upper node. For example, the upper node allocates control channels for the ACK/NACK message to the first RS 202, the second 204, and the MS 206.

When the RSs 202 and 204 have the ACK/NACK message received from the lower node, they transmit the ACK/NACK message and an ACK/NACK message for the data received from the upper node, to the upper node. For instance, the first RS 202 sends the ACK/NACK message for the data received from the BS 200 together with the ACK/NACK message received from the second RS 204 to the BS 200 over the (i+3)-th frame 216. The second RS 204 transmits the ACK/NACK message for the data received from the first RS 202 together with the ACK/NACK message received from the MS 206 to the first RS 202 over the (i+4)-th frame 218.

Namely, the RSs send the multi-ACK/NACK message for the data received between the BS and the MS in the different frames, to the upper node (e.g., the BS or the upper RS).

Figure 3A:
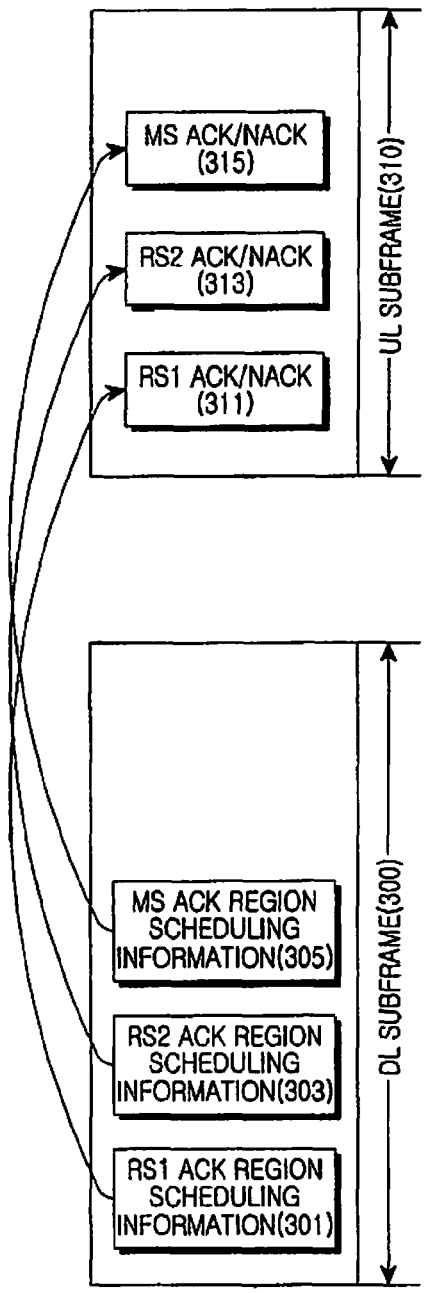
FIGS. 3A and 3B are diagrams illustrating frame structures for carrying ACK/NACK scheduling information for the DL data in the multihop relay wireless communication system according to an embodiment of the present invention.
Figure 3B:
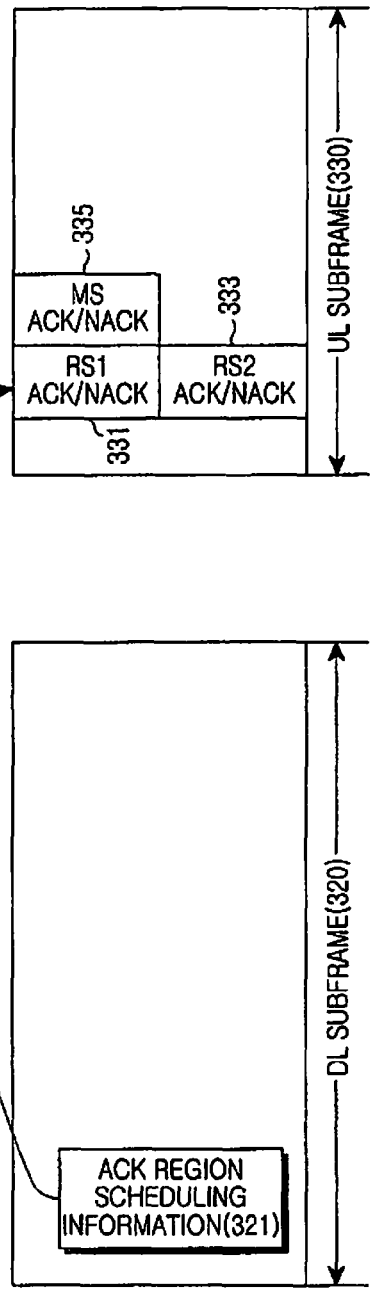

The upper node allocates the control channel for the multi-ACK/NACK message to the lower node as shown in FIGS. 3A and 3B so that the lower node can send the multi-ACK/NACK message. Herein, it is exemplified that the BS allocates the control channel for the multi-ACK/NACK message to the first RS in FIGS. 3A and 3B.

FIGS. 3A and 3B are diagrams illustrating frame structures for carrying ACK/NACK scheduling information for the DL data in the multihop relay wireless communication system according to an embodiment of the present invention. The frame structure of the Institute of Electrical and Electronics Engineers (IEEE) 802.16 system is explained in FIGS. 3A and 3B by way of example.

The BS allocates a multi-channel to the first RS so that the first RS can send multiple ACK/NACK messages as shown in FIG. 3A or 3B.

In FIG. 3A, the BS allocates the multi-channel for the ACK/NACK message to the first RS using a UL-MAP of the DL subframe 300. Hence, the first RS can send the ACK/NACK message of the data received from the BS and the ACK/NACK message received from the second RS or the MS, to the BS using the multi-channel at a time.

To allocate the multi-channel to the first RS for the ACK/NACK messages, the BS constitutes and includes Information Element (IE) to the ULT-MAP. The IE includes unique ID (e.g., Connection ID (CID)) information of the first RS, the second RS, and the MS, and adaptive modulation (Modulation and Coding Scheme (MCS)) level information.

The BS constitutes the IE to include a start point and an end point of the region for the ACK/NACK message for each unique ID. For example, the BS can use Hybrid ARQ (HARQ) ACK region allocation IE of the IEEE 802.16 standard as the IE for allocating the multi-channel to the first RS for the ACK/NACK messages. Herein, the IE represents the start point and the end point of the region for the ACK/NACK message for each unique ID by the subchannel unit in the frequency domain and by the Orthogonal Frequency Division Multiplexing (OFDM) symbol unit in the time domain.

The first RS sends the multi-ACK/NACK message to the BS using the region of the UL frame allocated by the BS for each unique ID in the UL-MAP. For example, the first RS sends the ACK/NACK message of the data received from the BS, to the BS over the first region 311 of the UL subframe 310 according to the ACK region scheduling information 301 allocated to the unique ID of the first RS. The first RS forwards the ACK/NACK message from the second RS to the BS over the second region 313 according to the ACK region scheduling information 303 allocated to the unique ID of the second RS. The first RS forwards the ACK/NACK message of the MS received from the second RS, to the BS over the third region 315 according to the MS ACK region scheduling information 305 allocated to the unique ID of the MS.

As above, the BS allocates the control channels for sending the ACK/NACK messages according to the unique IDs of the first RS, the second RS, and the MS to the first RS through the UL-MAP. The BS defines a separate message or a separate IE so that the first RS can surely acquire the functions of the unique IDs of the second RS and the MS included in the UL-MAP, and informs the first RS of the usage of the unique ID of the second RS and the MS.

In FIG. 3B, the BS allocates the multi-channel for the ACK/NACK messages to the first RS using the UL-MAP of the DL subframe 320. Thus, the first RS can send the ACK/NACK message of the data received from the BS and the ACK/NACK message from the second RS or the MS, to the BS using the multi-channel at a time.

The BS and the first RS agrees on the ACK/NACK message of the specific node in each frame in advance. For example, in the (i+5)-th frame of FIG. 2, the BS knows that the first RS sends the ACK/NACK message for data 5, the ACK/NACK message of the second RS for data 3, and the ACK/NACK message of the MS for data 1. Using the broadcasting information or a separate control channel, the BS agrees with the first RS that the first RS sends the ACK/NACK message of the specific node in each frame.

The BS constitutes the UL-MAP including the IE for the ACK/NACK message of the RS so that the first RS can send the multi-ACK/NACK message. The IE for the ACK/NACK message of the RS includes information relating to the start point and the end point of the multi-ACK/NACK message. For example, the BS can use the HARQ ACK region allocation IE of the IEEE 802.16 system as the IE for the ACK/NACK message. In the UL frame, the start point and the end point of the ACK/NACK message are represented by the subchannel in the frequency domain and by the OFDM symbol in the time domain.

The first RS sends the multi-ACK/NACK message to the BS through the region of the UL frame 330 allocated from the BS through the UL-MAP. The first RS sends the ACK/NACK messages of the nodes pre-agreed with the BS, to the BS. For instance, the first RS transmits the ACK/NACK message 331 of the data received from the BS, the ACK/NACK message 333 from the second RS, and the ACK/NACK message 335 of the MS provided from the second RS, over the region allocated by the BS using the ACK region scheduling information 321 of the UL-MAP.

Alternatively, the first RS sends the multi-ACK/NACK message according to the data transmission order. In the (i+5)-th frame 220 of FIG. 2, the first RS 202 sends the ACK/NACK message of the MS 206 for data 1 of the high transmission order over the first region 331. Next, the first RS 202 sends the ACK/NACK message of the second RS 204 for data 3 over the second region 333. Lastly, the first RS 202 sends the ACK/NACK message for data 5 over the third region 335. The first RS 202 may transmit the ACK/NACK messages from the lowest transmission order in sequence.

The BS and the first RS pre-agrees on the transmission order of the ACK/NACK messages in the multi-ACK/NACK message. Accordingly, the BS knows which data the multiple ACK/NACK messages from the first RS in the frame pertains to and which nodes send the multiple ACK/NACK messages.

Therefore, the BS does not need to separately allocate an offset value to distinguish the multiple ACK/NACK messages sent from the first RS.

As mentioned above, the first RS transmits the ACK/NACK messages of the first RS, the second RS, and the MS to the BS through the multi-control channel allocated from the BS. In doing so, the BS and the first RS should agree on which data the ACK/NACK message sent through the multi-control channel pertains to.

For doing so, the BS appoints the ACK/NACK message of the data to be sent to the first RS through the multi-control channel, using the broadcasting information or the separate control channel. Based on the ACK/NACK message information of the data sent through the multi-control channel agreed with the BS, the first RS can recognize which data transmitted and received with frames ahead the ACK/NACK messages of the first RS and the lower nodes pertain to in every transmission through the multi-control channel based on the transmission time.

If the BS does not agree with the first RS on the data to be sent through the multi-control channel in advance using the broadcasting message or the separate control channel, the BS may transmit the ACK/NACK message information of the data to be sent through the multi-control channel, to the first RS using the IE for the ACK/NACK message.

In this embodiment of the present invention, the wireless communication system constructs the UL-MAP to include the scheduling information for the ACK/NACK message region in the UL subframe of the same frame using the DL subframes 300 and 320. In another embodiment of the present invention, the wireless communication system constructs the UL-MAP to include the scheduling information for the ACK/NACK message region in the UL subframe next to several frames through the DL subframes 300 and 320.

Now, the wireless communication system transmits the ACK/NACK message for the UL data as shown in FIG. 4.

FIG. 4 is a diagram illustrating a UL data transmission in the multihop relay wireless communication system according to an embodiment of the present invention. It is assumed that a BS 400 receives data 1 and data 2 from an MS 406.

When data 1 and data 2 are transmitted from the MS 406 to the BS 400, the BS 400 transmits scheduling information for data 1 to a first RS 402 over the i-th frame 410 in step 431.

The BS 400 transmits scheduling information for data 2 to the first RS 402 over the (i+1)-th frame 412 in step 433.

The first RS 402 forwards the scheduling information for data 1 to a second RS 404 over the (i+1)-th frame 412 in step 435.

The first RS 402 forwards the scheduling information for data 2 to the second RS 404 over the (i+2)-th frame 414 in step 437.

The second RS 404 forwards the scheduling information for data 1 to the MS 406 over the (i+2)-th frame 414 in step 439.

The second RS 404 forwards the scheduling information for data 2 to the MS 406 over the (i+3)-th frame 416 in step 441.

The MS 406 transmits data 1 to the second RS 404 according to the scheduling information of data 1, which is provided from the second RS 404, over the (i+3)-th frame 416 in step 443. The second RS 404 checks for errors in data 1 received from the MS 406.

Over the (i+4)-th frame 418, the second RS 404 sends an ACK/NACK message according to the error detection of data 1 received from the MS 406. For example, when data 1 is corrupted, the second RS 404 sends the NACK message to the first RS 402 and the MS 406.

When data 1 has no errors, the second RS 404 transmits data 1 and the ACK message of data 1 to the first RS 402 in step 445. The first RS 402 checks for errors in data 1 received from the second RS 404.

The second RS 404 sends an ACK message for data 1 to the MS 406 in step 447.

The MS 406 transmits data 2 to the second RS 404 according to the scheduling information of data 2, which is provided from the second RS 404, over the (i+4)-th frame 418 in step 449. The second RS 404 checks for errors in data 2 received from the MS 406.

Over the (i+5)-th frame 420, the first RS 402 sends an ACK/NACK message according to the error detection of data 1 received from the second RS 404. For instance, when data 1 is corrupted, the first RS 402 sends the NACK message for data 1 to the BS 400 and the second RS 402.

The first RS 404 also sends the ACK/NACK message for data 1, which is received from the second RS 404 over the (i+4)-th frame 418, to the BS 400 in step 453.

When data 1 has no errors, the first RS 402 transmits data 1 and the ACK message of data 1 to the BS 400 in step 451.

The first RS 402 also sends the ACK/NACK message for data 1, which is received from the second RS 404 over the (i+4)-th frame 418, to the BS 400 in step 453.

The first RS 402 sends the ACK message for data 1 to the second RS 404 in step 455.

Over the (i+5)-th frame 420, the second RS 404 sends an ACK/NACK message according to the error detection of data 2 received from the MS 406. For instance, when data 2 is corrupted, the second RS 404 sends the NACK message for data 2 to the first RS 402 and the MS 406.

When the data has no errors, the second RS 404 transmits data 2 and the ACK message of data 2 to the first RS 402 in step 457. The first RS 402 checks for errors in data 2 received from the second RS 404.

The second RS 404 sends the ACK message for data 2 to the MS 406 in step 459.

Over the (i+6)-th frame 422, the first RS 402 sends an ACK/NACK message according to the error detection of data 2 received from the second RS 404. For example, when data 2 is corrupted, the first RS 402 sends the NACK message for data 2 to the BS 400 and the second RS 402.

The first RS 404 also sends the ACK/NACK message for data 2, which is received from the second RS 404 over the (i+5)-th frame 420, to the BS 400 in step 463.

When data 2 has no errors, the first RS 402 transmits data 2 and the ACK message of data 2 to the BS 400 in step 461.

In doing so, the first RS 402 also sends the ACK/NACK message for data 2, which is received from the second RS 404 over the (i+5)-th frame 420, to the BS 400 in step 463.

Next, the first RS 402 sends the ACK message for data 2 to the second RS 404 in step 465.

As explained above, the first RS 402, the second RS 404, and the MS 406 of the wireless communication system send the ACK/NACK message for the UL data to the upper node and the lower node. The first RS 402, the second RS 404, and the MS 406 send the ACK/NACK message through the control channel provided from the upper node.

When having the ACK/NACK message from the lower node, the RSs 402 and 404 transmit it together with the ACK/NACK message for the data received from the lower node, to the upper node. For example, the first RS 402 transmits the ACK/NACK message of the data received from the second RS 404 over the (i+5)-th frame 420 and the ACK/NACK message of the second RS 404, which is provided from the second RS 404, to the BS 400.

That is, the RS transmits the multi-ACK/NACK message for the UL data between the BS and the MS in the different time frames, to the upper node (e.g., the BS or the upper RS).

Figure 5:
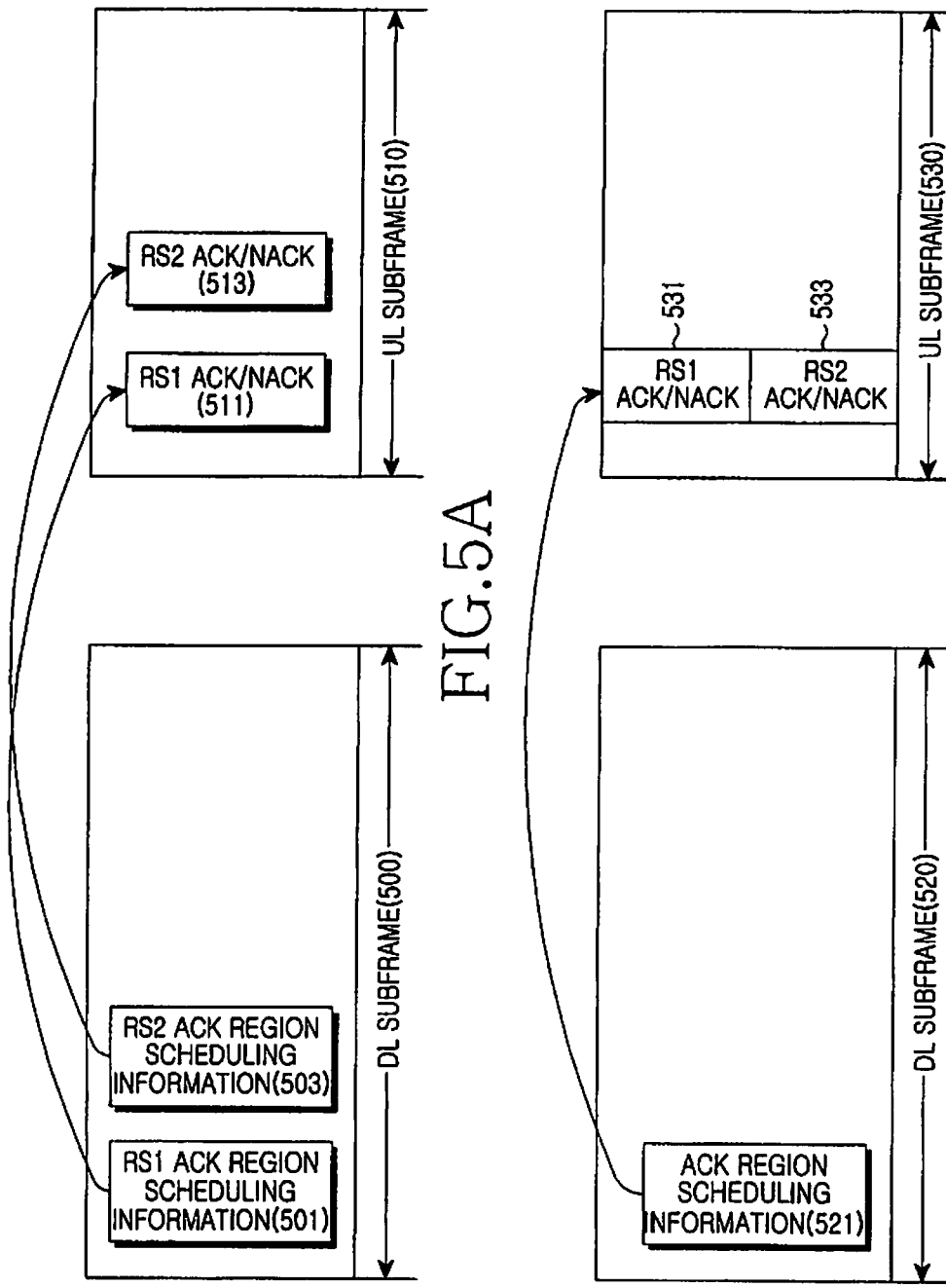
FIGS. 5A and 5B are diagrams illustrating frame structures for carrying ACK/NACK scheduling information for the UL data in the multihop relay wireless communication system according to an embodiment of the present invention.

The upper node allocates the control channel for the multi-ACK/NACK message to the upper node as shown in FIGS. 5A and 5B so that the lower node can send the multi-ACK/NACK message. Herein, it is exemplified that the BS allocates the control channel for the multi-ACK/NACK message to the first RS in FIGS. 5A and 5B.

FIGS. 5A and 5B are diagrams illustrating frame structures for carrying ACK/NACK scheduling information for the UL data in the multihop relay wireless communication system according to an embodiment of the present invention. By way of example, FIGS. 5A and 5B depict the frame structure of the IEEE 802.16 system.

The BS allocates the multi-channel to the first RS as shown in FIG. 5A or FIG. 5B so that the first RS can send the multiple ACK/NACK messages with respect to the UL data.

In FIG. 5A, the BS allocates the multi-channel for the ACK/NACK message to the first RS using the UL-MAP of the DL subframe 500. Hence, the first RS can transmit the ACK/NACK message for the UL data together with the ACK/NACK message from the second RS, to the BS using the multi-channel provided from the BS.

To allocate the multi-channel for the ACK/NACK message to the first RS, the BS constitutes and includes the IE to the UL-MAP. The IE includes unique IDs (e.g., CIDs) of the first RS, the second RS, and the MS, and the adaptive modulation (e.g., MCS) level information.

The BS constitutes the IE to include the start point and the end point for the ACK/NACK message for each unique ID. For example, the BS utilizes the HARQ ACK region allocation IE of the IEEE 802.16 system as the IE to allocate the multi-channel for the ACK/NACK messages to the first RS. Herein, the HARQ ACK region allocation IE can be newly defined for the resource allocation for the UL data.

The IE indicates the start point and the end point of the region for the ACK/NACK message for each unique ID by the subchannel in the frequency domain and bye the OFDM symbol in the time domain.

The first RS sends the multi-ACK/NACK message to the BS using the region of the UL frame allocated by the BS through the UL-MAP for each unique ID. For example, the first RS forwards the ACK/NACK message of the data provided from the second RS to the BS over the first region 511 of the UL subframe 510 according to the ACK region scheduling information 501 allocated based on the unique ID of the first RS. Also, the first RS forwards the ACK/NACK message received from the second RS over the second region 513, to the BS according to the ACK region scheduling information 503 allocated based on the unique ID of the second RS.

As above, the BS allocates the control channels for sending the ACK/NACK message based on the unique IDs of the first RS and the second RS, to the first RS through the UL-MAP. In doing so, the BS defines a separate message so that the first RS can surely acquire the function of the unique ID of the second RS and the MS in the UL-MAP, and informs the first RS of the usage of the CID of the second RS and the MS.

The BS allocates the multi-channel for the ACK/NACK message to the first RS using the UL-MAP of the DL subframe 520 as shown in FIG. 5B. Hence, the first RS can send the ACK/NACK message for the UL data and the ACK/NACK message received from the second RS to the BS using the multi-channel at one time.

The BS and the first RS agree on specific nodes the ACK/NACK messages pertain to on each frame in advance. For example, the BS knows that the first RS will send the ACK/NACK message for data 1 and the ACK/NACK message of the second RS for the data 1 over the (i+5)-th frame 420 of FIG. 4. The BS agrees with the first RS on the specific node of which the ACK/NACK message is forwarded by the first RS in every frame, using the broadcasting channel or the separate control channel.

The BS constitutes an IE including the start point and the end point of the multi-ACK/NACK message and includes the IE to the UL-MAP so that the first RS can send the multiple ACK/NACK messages. For instance, the BS constitutes the IE for the ACK/NACK message using the HARQ region allocation IE of the IEEE 802.16 system. The start point and the end point of the ACK/NACK message in the UL frame are represented by the subchannel in the frequency domain and by the OFDM symbol in the time domain.

The first RS transmits the multiple ACK/NACK messages 531, 533 to the BS using the regions of the UL frame 530 allocated from the BS using the ACK region scheduling information 521 of the UL-MAP. In other words, the first RS transmits the ACK/NACK messages of the nodes pre-agreed with the BS, to the BS over the UL frame regions allocated from the BS.

As mentioned above, the first RS forwards the ACK/NACK messages of the first RS and the second RS to the BS through the multi-control channel allocated from the BS. In doing so, the BS and the first RS should agree on data of which the ACK/NACK message is sent through the multi-control channel.

For doing so, the BS appoints the ACK/NACK message of the data to be sent to the first RS through the multi-control channel, using the broadcasting channel or the separate control channel. The first RS can acquire which data sent several frames ahead based on the transmission point, the ACK/NACK messages of the first RS and the lower nodes pertain to at every transmission time through the multi-control channel according to the ACK/NACK message information of the data to be sent through the multi-control channel agreed with the BS.

If the BS does not pre-designate the data to be sent through the multi-control channel with the first RS using the broadcasting message or the separate control channel, the BS may transmit the ACK/NACK message information of the data to be sent in the multi-control channel using the IE for the ACK/NACK message.

Now, operations of the RS for transmitting the ACK/NACK message for the retransmission in the wireless communication system are described.

Figure 6:
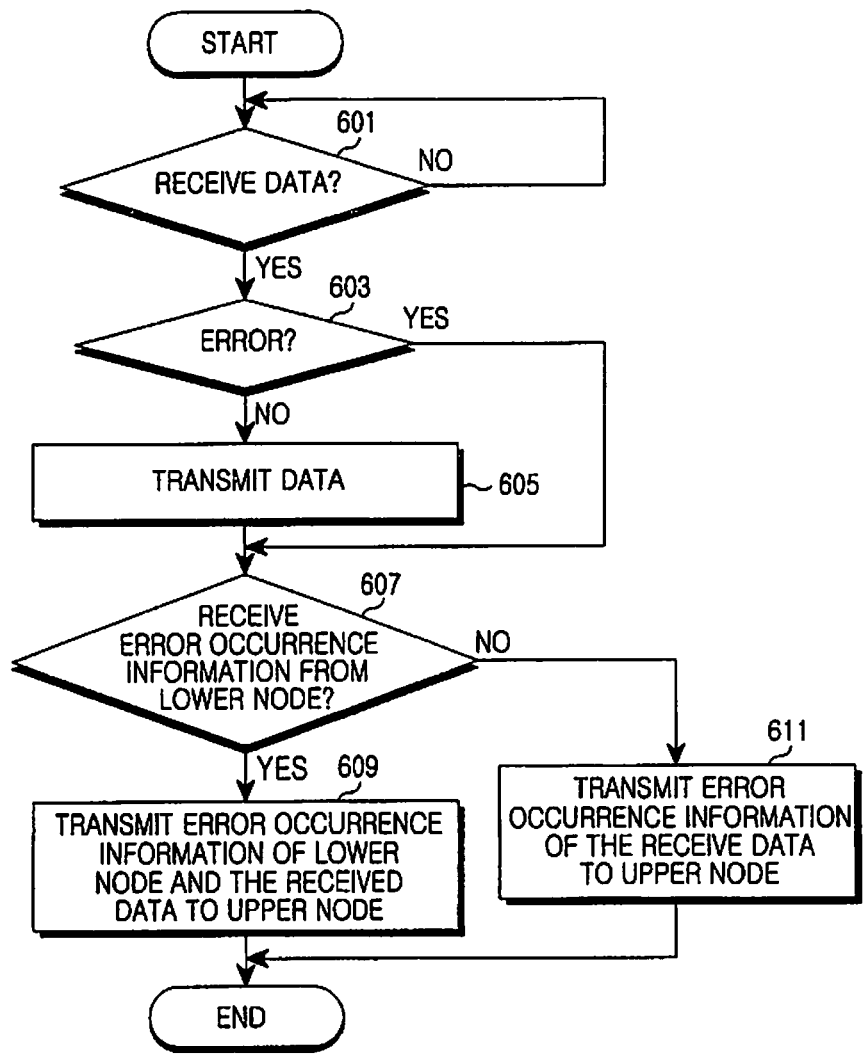
FIG. 6 is a flow diagram illustrating operations of a Relay Station (RS) for the ARQ in the multihop relay wireless communication system according to an embodiment of the present invention.

FIG. 6 is a flow diagram illustrating the operations of the RS for the ARQ in the multihop relay wireless communication system according to an embodiment of the present invention.

In step 601, the RS checks whether data is received. For instance, in the DL, the RS checks whether data is received from the upper node. In the UL, the RS checks whether data is received from the lower node.

When receiving the data, the RS checks for errors in the received data in step 603.

When an error is detected in the received data, the RS checks whether error occurrence information is received from the lower node in step 607. Herein, the error occurrence information indicates the ACK message or the NACK message. In the DL, the RS checks whether the ACK/NACK message is received from the lower node in the previous frame as shown in FIG. 2. In the UL, the RS checks whether the ACK/NACK message is received from the lower node in the previous frame as shown in FIG. 4.

By contrast, when the data has no errors, the RS forwards the received data to the upper node or the lower node in step 605. For example, In the DL, the RS forwards the data from the upper node to the lower node. In the UL, the RS forwards the data from the lower node to the upper node.

In step 607, the RS checks whether error occurrence information is received from the lower node. For instance, in the DL, the RS checks whether the ACK/NACK message is received from the lower node in the previous frame as shown in FIG. 2. In the UL, the RS checks whether the ACK/NACK message is received from the lower node as shown in FIG. 4.

When receiving the error occurrence information from the lower node, the RS transmits the error occurrence information of the received data and the error occurrence information received from the lower node, to the upper node in step 609. In doing so, the RS agrees with the upper node on the node that sends the error occurrence information and the data in the corresponding frame, using the broadcasting information or a separate control channel. Accordingly, the RS transmits the error occurrence information of the data agreed with the upper node, to the upper node through the multi-control channel provided from the upper node.

When receiving no error occurrence information from the lower node, the RS transmits the error occurrence information of the received data to the upper node through the control channel provided from the upper node in step 611.

Next, the RS finishes this process.

Figure 7:
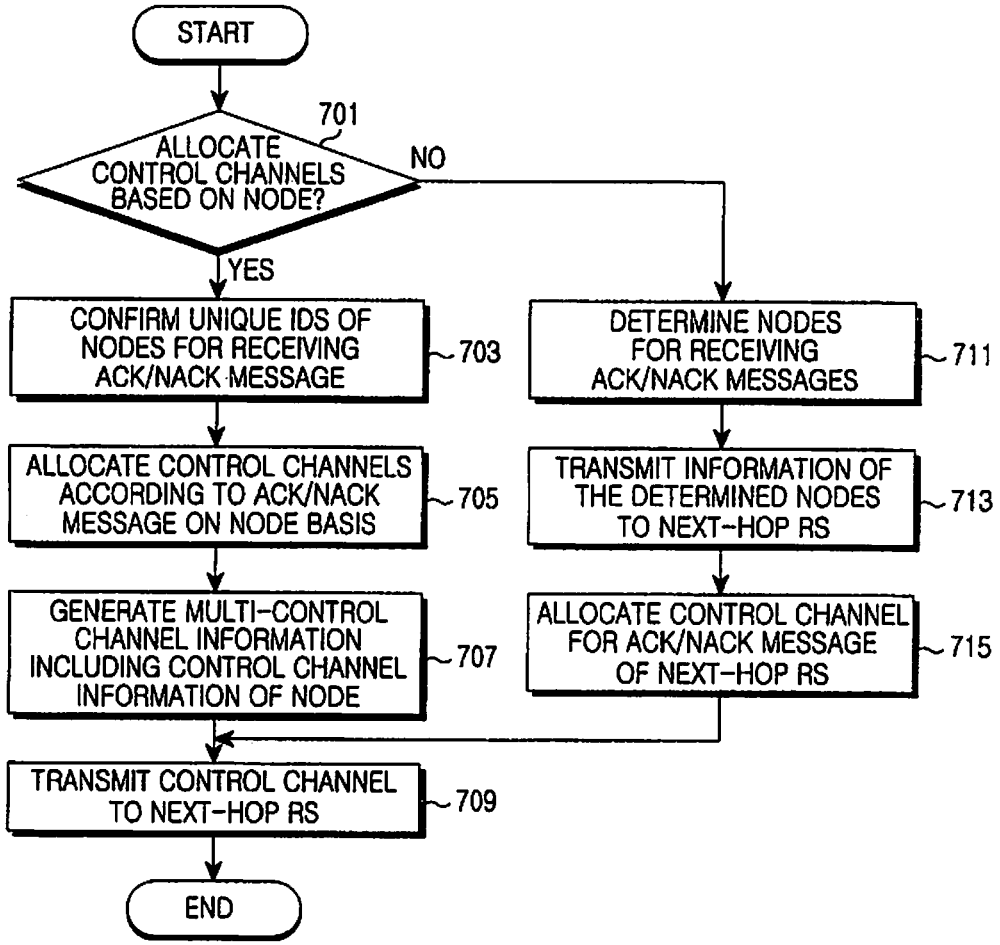
FIG. 7 is a flow diagram illustrating operations of a Base Station (BS) for the ARQ in the multihop relay wireless communication system according to an embodiment of the present invention.

Hereinafter, descriptions explain the operations of the upper node for allocating the multi-control channel through which the RS sends the multi-ACK/NACK message in the wireless communication system. In FIG. 7, the upper node agrees with the next-hop RS on the data that carries the error occurrence information according to the transmission time using the broadcasting information or the separate control channel. Next, the upper node allocates the multi-control channel for the RS to transmit the error occurrence information of the corresponding data, which will be explained.

FIG. 7 is a flow diagram illustrating operations of the BS for the ARQ in the multihop relay wireless communication system according to an embodiment of the present invention. While the BS of the upper nodes is explained by way of example, the upper nodes operate the same as in FIG. 7.

In step 701, the BS determines whether to allocate the control channel for the ACK/NACK control message to the next-hop RS on the node basis as shown in FIG. 3A or FIG. 5A.

To allocate the control channel on the node basis, the BS confirms the unique IDs of the nodes that send the ACK/NACK message to the BS through the next-hop RS in step 703. Herein, the unique ID indicates the CID.

In step 705, the BS allocates the control channel for the ACK/NACK message based on the unique ID.

In step 707, the BS generates the multi-control channel including the control channel information allocated for each unique ID. For example, the BS generates the IE including the control channel information allocated for each unique ID.

In step 709, the BS transmits the multi-control channel to the next-hop RS. More specifically, the BS constitutes the UL-MAP, which includes the IE including the control channel information allocated for each unique ID, and transmits the UL-MAP to the next-hop RS. For example, the BS transmits the control channel information allocated for each unique ID to the next-hop RS as shown in FIG. 3A or 5A.

By contrast, when determining not to allocate the control channel on the node basis in step 701, the BS determines the nodes from which the ACK/NACK messages are received through the next-hop RS in each frame in step 711.

In step 713, the BS transmits the information of the determined nodes to the next-hop RS. For instance, the BS transmits the information of the determined nodes to the next-hop RS using the broadcasting information or the separate control channel.

In step 715, the BS allocates the multi-control channel to the next-hop RS to receive the ACK/NACK message with respect to the determined nodes.

Next, the BS proceeds to step 709 and transmits the multi-control channel to the next-hop RS. For example, the BS provides the multi-control channel information to the next-hop RS as shown in FIG. 3B or 5B. In doing so, the BS includes only the information of the start point and the end point of the multi-control channel. Thus, the RS, receiving the multi-control channel allocated from the BS, transmits the ACK/NACK messages of the nodes that are agreed with the BS in step 713, to the BS in the multi-control channel.

Next, the BS finishes this process.

The structure of the RS for sending the ACK/NACK message for the retransmission in the wireless communication system is now explained.

Figure 8:
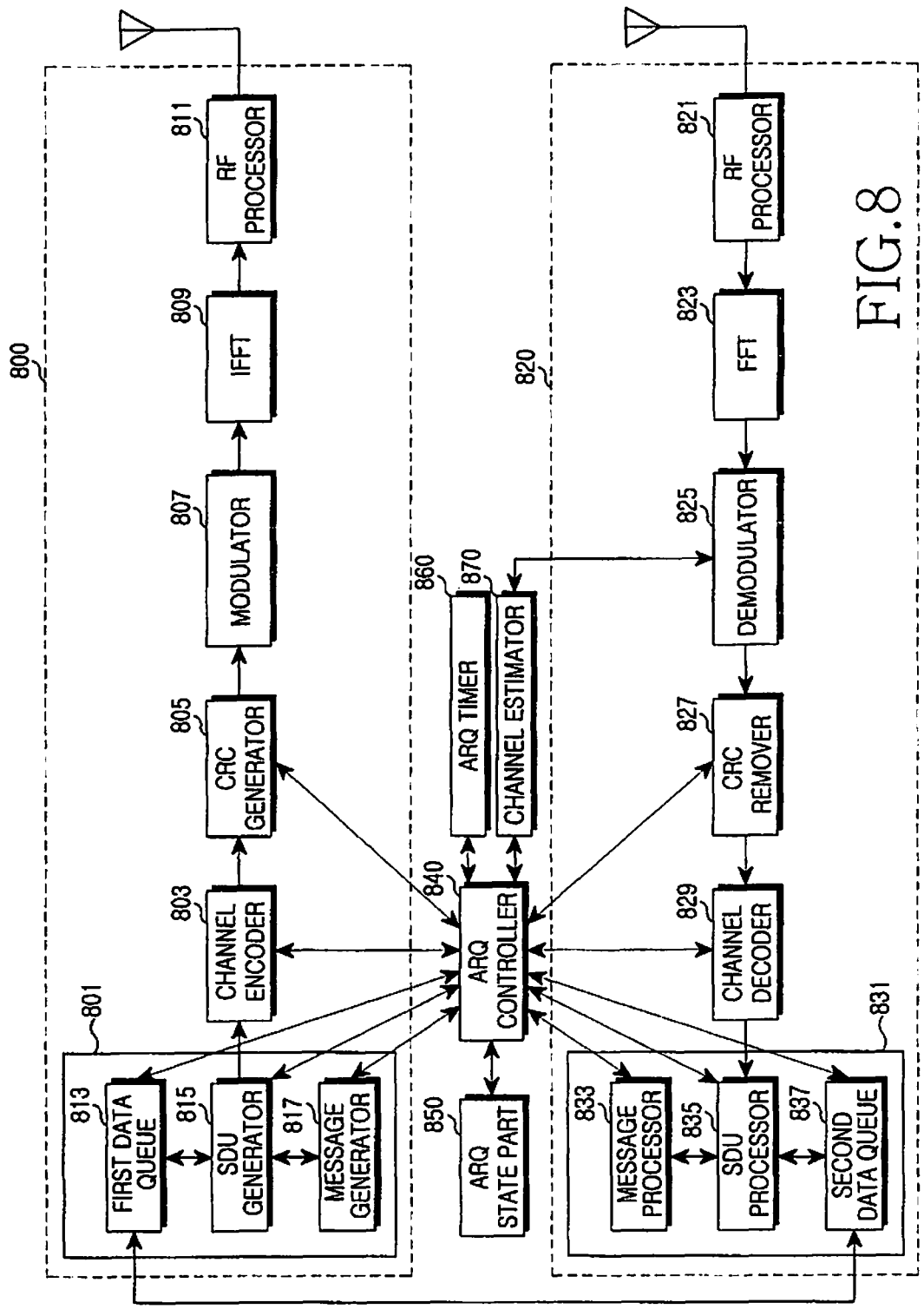
FIG. 8 is a diagram illustrating the RS in the multihop relay wireless communication system according to an embodiment of the present invention.

FIG. 8 is a block diagram of the RS in the multihop relay wireless communication system according to an embodiment of the present invention. While it is assumed that a transmitter 800 and a receiver 820 use different antennas, they may share one antenna.

The RS of FIG. 8 includes the transmitter 800 and the receiver 820. The RS also includes an ARQ controller 840, an ARQ state part 850, an ARQ timer 860, and a channel estimator 870 which are shared by the transmitter 800 and the receiver 820.

The transmitter 800 includes a data generator 801, a channel encoder 803, a CRC generator 805, a modulator 807, an Inverse Fast Fourier Transform (IFFT) operator 809, and a Radio Frequency (RF) processor 811.

The data generator 801 aggregates data stored to a data queue 813 and a control message generated at a message generator 817 in a Service Data Unit (SDU) generator 815, and generates one data for the physical layer transmission. Herein, when the data received through the receiver 820 is detected with no errors, the message generator 817 generates an ACK control message. When the data has an error, the message generator 817 generates a NACK message. In doing so, when the message generator 817 has the ACK/NACK message received from the lower node, it generates the message to deliver the ACK/NACK message of the data received at the RS together with the ACK/NACK message received from the lower node.

The channel encoder 803 encodes the data output from the data generator 801 at a corresponding modulation level (e.g., MCS level). The CRC generator 805 generates and inserts a CRC code to the data output from the channel encoder 803.

The modulator 807 modulates the data output from the CRC generator 805 at the corresponding modulation level (e.g., MCS level).

The IFFT operator 809 IFFT-processes and converts the frequency-domain data output from the modulator 807 to a time-domain signal.

The RF processor 811 up-converts the baseband signal output from the IFFT operator 809 to an RF signal and outputs the RF signal to the upper node or the lower node via the antenna.

The receiver 820 includes an RF processor 821, an FFT operator 823, a demodulator 825, a CRC remover 827, a channel decoder 829, and a data processor 831.

The RF processor 821 down-coverts the RF signal received on the antenna from the upper node or the lower node to a baseband signal.

The FFT operator 823 FFT-processes and converts the time-domain signal output from the RF processor 821 to a frequency-domain signal.

The demodulator 825 demodulates the signal output from the FFT operator 823 at the corresponding modulation level. The demodulator 825 outputs the demodulated signal to the CRC remover 827 and the channel estimator 870.

The CRC remover 827 determines whether the signal has error or not by checking the CRC code of the signal output from the demodulator 825. The CRC remover 827 eliminates the CRC code from the signal output from the demodulator 825.

The channel decoder 829 decodes the error-free signal output from the CRC remover 827 at the corresponding modulation level.

An SDU processor 835 of the data processor 831 separates the data and the control message from the physical layer signal output from the channel decoder 829. Next, the SDU processor 835 provides and stores the data to a second data queue 837, and provides and decodes the control message to a message processor 833. Herein, the first data queue 813 and the second data queue 837 can be the same data queue.

The message processor 833 confirms the ACK/NACK message received from the lower node. The message processor 833 confirms the multi-control channel information for the ACK/NACK message from the upper node, and provides the multi-control channel information to the transmitter 800.

The ARQ state part 850 manages the ARQ state for the retransmitted data. The ARQ timer 860 manages a lifetime for the retransmission of the RS.

The ARQ controller 840 controls the ARQ operations of the RS in association with the ARQ state part 850 and the ARQ timer 860. The ARQ controller 840 controls the retransmission in communication with the data generator 801, the channel encoder 803, and the CRC generator 805 of the transmitter 800. For example, when the retransmission request is received from the lower node through the receiver 820, the ARQ controller 840 controls the transmitter 800 to send the retransmission request signal to the upper node. When the retransmission scheduling information is received from the upper node, the ARQ controller 840 controls to encode the data received from the upper node and stored to the data queue 813 according to the channel condition, to insert the CRC code, and to retransmit the data to the lower node which requests the retransmission.

The ARQ controller 840 controls the transmitter 800 to send the multi-ACK/NACK message. For example, the ARQ controller 840 controls the transmitter 800 to transmit the ACK/NACK message for the data received at the RS together with the ACK/NACK message from the lower node, to the upper node.

The ARQ controller 840 controls the retransmission while communicating with the data processor 831, the channel decoder 829, and the CRC remover 827 of the receiver 820. For instance, when the CRC remover 827 detects error in the received data, the ARQ controller 840 controls the message generator 817 to generate the NACK control message to be sent to the BS.

When receiving a lifetime expiration message from the ARQ timer 860 in the process of the retransmission, the ARQ controller 840 finishes the retransmission.

Now, another link configuration in the DL of the multihop relay wireless communication system is described. It is assumed that the fundamental unit of the data transmission in the wireless communication system is a frame. It is assumed that the frame is defined as a physical frame determined by taking into account the DL burst processing delay of the RS, the ACK feedback delay of the MS, and the ACK forwarding delay of the RS.

Figure 9:
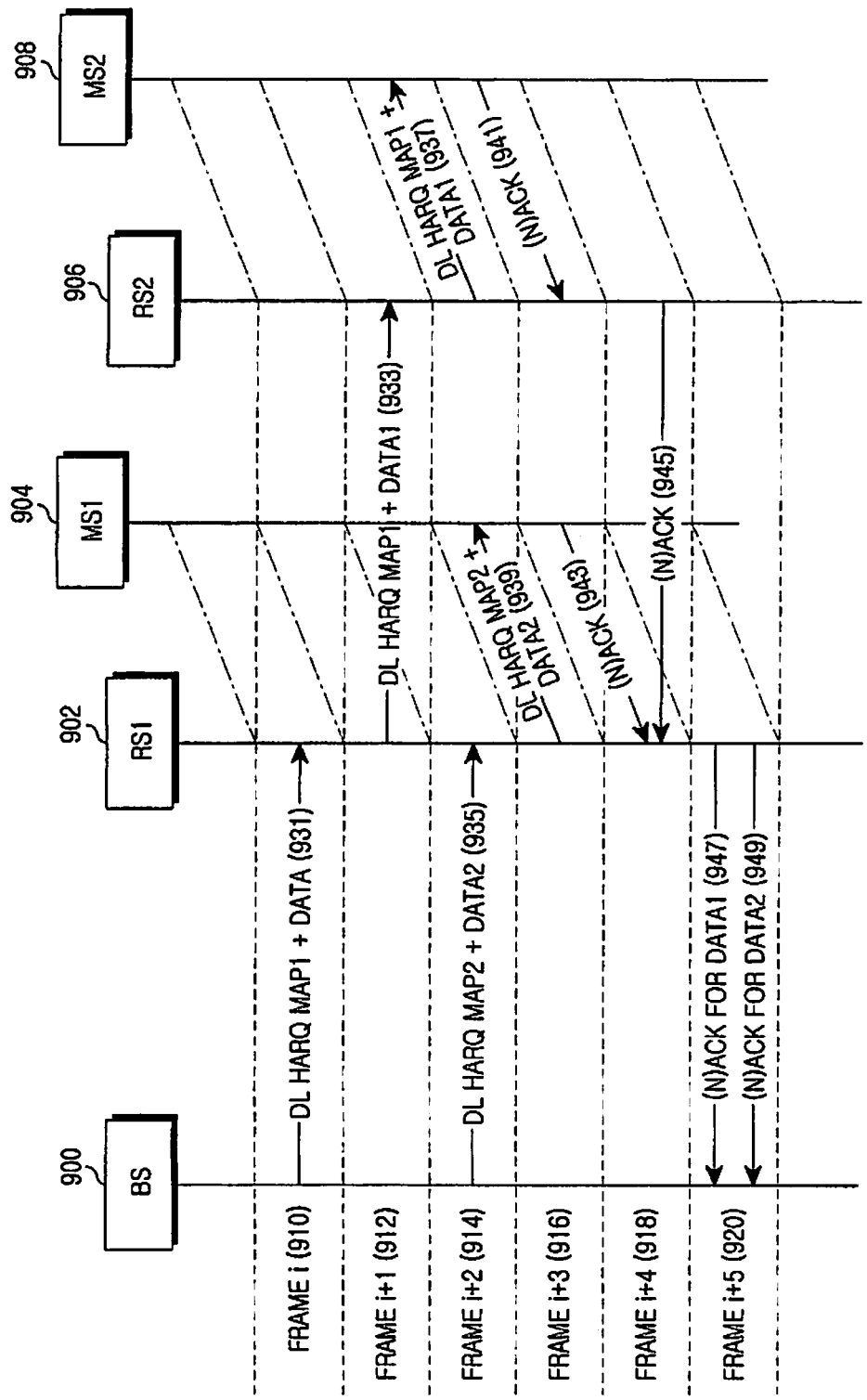
FIG. 9 is a diagram illustrating a DL data transmission in a multihop relay wireless communication system according to an embodiment of the present invention.

FIG. 9 illustrates a DL data transmission in a multihop relay wireless communication system according to another exemplary embodiment of the present invention.

The wireless communication system of FIG. 9 includes a BS 900, a first RS 902, a first MS 904, a second RS 906, and a second MS 908. Herein, the first MS 904 represents at least one MS that communicates with the first RS 902, and the second MS 908 represents at least one MS that communicates with the second RS 906.

To transmit HARQ data to the second MS 908, the BS 900 transmits scheduling information 1 for sending data 1 to the second MS 908, and data 1 to the first RS 902 over the i-th frame 910 in step 931. For example, the scheduling information is the HARQ DL-MAP information defined in the IEEE 802.16 standard.

Receiving the scheduling information 1 and data 1 from the BS 900, the first RS 902 forwards the scheduling information 1 and data 1 to the second RS 906 over the (i+1)-th frame 912 in step 933. At this time, it is assumed that data 1 has no errors.

Upon receiving the scheduling information 1 and data 1 from the first RS 902, the second RS 906 forwards the scheduling information 1 and data 1 to the second MS 908 over the (i+2)-th frame 914 in step 937. At this time, it is assumed that data 1 has no errors.

Upon receiving the scheduling information 1 and data 1 from the second RS 906, the second MS 908 confirms the ACK allocation region for sending an ACK/NACK message based on the scheduling information 1.

The second MS 908 sends the ACK/NACK message for data 1 to the second RS 906 through the ACK allocation region over the (i+3)-th frame 916 in step 941.

Upon receiving the ACK/NACK message for the data 1 from the second MS 908, the second RS 906 forwards the ACK/NACK message of the second MS 908 for data 1 to the first RS 902 over the (i+4)-th frame 918 in step 945.

Upon receiving the ACK/NACK message of the second MS 908 for data 1 from the second RS 906, the first RS 902 forwards the ACK/NACK message of the second MS 908 for data 1 to the BS 900 over the (i+5)-th frame 906 in step 947.

Next, to transmit HARQ data to the first MS 904, the BS 900 transmits scheduling information 2 for sending data 2 to the first MS 904, and data 2 to the first RS 902 over the (i+2)-th frame 914 in step 935. For example, the scheduling information is the HARQ DL-MAP information defined in the IEEE 802.16 standard.

Upon receiving the scheduling information 2 and data 2 from the BS 900, the first RS 902 forwards the scheduling information 2 and data 2 to the first MS 904 over the (i+3)-th frame 916 in step 939. At this time, it is assumed that data 2 has no errors.

Receiving the scheduling information 2 and data 2 from the first RS 902, the first MS 904 confirms the ACK allocation region for sending the ACK/NACK message from the scheduling information 2.

Over the (i+4)-th frame 918, the first MS 904 sends the ACK/NACK message for data 2 to the first RS 902 through the ACK allocation region in step 943.

Receiving the ACK/NACK message for data 2 from the first MS 904, the first RS 902 forwards the ACK/NACK message of the first MS 904 for data 2 to the BS 900 over the (i+5)-th frame 920 in step 949.

As above, the first RS 902 transmits the ACK/NACK message for data 2 sent to the first MS 904 and the ACK/NACK message for the data 1 sent to the second MS 908, to the BS 900 over the (i+5)-th frame 920. That is, the RS provides the multi-ACK/NACK message for the data received in the different time frames between the BS and the MS, to the upper node (e.g., the BS or the upper RS).

Thus, the upper node allocates the control channel for the multi-ACK/NACK message to the lower node so that the lower node can send the multi-ACK/NACK message as shown in FIGS. 10A and 10B. In FIGS. 10A and 10B, the BS allocates the control channel for the multi-ACK/NACK message to the first RS, which is explained.

FIGS. 10A and 10B are diagrams illustrating frame structures for carrying ACK/NACK scheduling information for the DL data in the multihop relay wireless communication system according to an embodiment of the present invention.

As shown in FIG. 10A or 10B, the BS allocates the multi-channel so that the first RS can send the ACK/NACK message for the DL data through the multi-channel.

In FIG. 10A, the BS allocates different ACK allocation regions for the first MS and the second MS using the UL-MAP of DL subframe 1000 and transmits the ACK allocation regions to the first RS. The BS constitutes resource allocation information sent to the first RS according to allocation information of the first MS and the second MS.

According to the resource allocation information from the BS, the first RS sends the ACK/NACK message 1011 for the first MS and the ACK/NACK message 1013 for the second MS to the BS using the different regions of UL subframe 1010 according to ACK region scheduling information 1001, 1003.

In FIG. 10B, the BS allocates the ACK allocation regions 1031 and the 1033 of the first MS and the second MS in UL subframe 1030 as one UL frame region using the ACK region scheduling information 1021 of UL-MAP of DL subframe 1020 and sends the UL frame region to the first RS. In this case, the wireless communication system can reduce the overhead in the DL scheduling, compared to FIG. 10A.

To allocate the ACK allocation regions as shown in FIG. 10B, the BS needs to send to the first RS the information for distinguishing the ACK information of the first MS and the second MS in the one ACK allocation region allocated in the region of the UL subframe. For example, the BS includes the end point information of the ACK/NACK message of the MS or the start point information of the ACK/NACK message of the next MS, to the scheduling information of the ACK allocation region.

Alternatively, the first RS sends the ACK/NACK messages of the MSs in the data transmission order agreed with the BS. For instance, the BS transmits the data 1 over the i-th frame 910 and then transmits the data 2 over the (i+2)-th frame 914 in FIG. 9. Thus, the first RS firstly sends the ACK/NACK message of the second MS for the data 1 firstly received from the BS, over the (i+5)-th frame 920. Next, the first RS transmits the ACK/NACK message of the second MS for the data 2.

After sending the ACK/NACK message of the second MS for the data 2, the first RS can send the ACK/NACK message of the first MS for the data 1.

Even when the BS transmits the data 1 and the data 2 in the same DL subframe and the first RS sends the ACK/NACK messages for the data 1 and the data 2 in the same UL subframe, the first RS can transmit the ACK/NACK messages in sequence in the order of the data scheduled and received from the BS.

Accordingly, the BS merely needs to inform the first RS of the region information of the UL frame for allocating the ACK/NACK messages from the next-hop MSs.

As described above, using the MAP control message that is the ACK region allocation IE of the IEEE 802.16 standard, the BS can transmit the region information for delivering the ACK/NACK message to the lower RS. In the MAP control message, the ID of the lower RS and the UL ACK allocation region information are represented by the OFDM subchannel and by the OFDM symbol.

Using the method of FIG. 10A, the BS includes the end point information or the start point information of the multi-ACK channel to the MAP control message. Using the method of FIG. 10B, the BS can transmit the multi-ACK channel in the order agreed between the BS and the RS without including the additional information to the MAP control message.

As set forth above, the upper node of the multihop relay wireless communication system transmits the multi-control channel to the lower node for the control message for the data retransmission. Therefore, the RS can transmit the control messages for the ARQ provided from the lower nodes and the control messages for the ARQ of the RS, to the upper node at the same time.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An operating method of a Relay Station (RS) in a wireless relay communication system, the method comprising:
   receiving first data from an upper node;
   transmitting the first data to a first lower node;
   receiving second data from the upper node;
   transmitting the second data to a second lower node;
   receiving a plurality of acknowledgement information items from at least one of the first lower node and the second lower node, in response to receipt of at least one of the first data and the second data from the RS;
   transmitting the received plurality of acknowledgement information items to the upper node at a same time corresponding to a single transmission time frame,
   wherein each of the plurality of acknowledgement information items comprises an Acknowledgement (ACK) or a Negative ACK (NACK) generated in response to data transmitted to at least one of the first lower node and the second lower node, and
   wherein transmitting the plurality of acknowledgement information items to the upper node comprises:

confirming control channel information for transmitting the plurality of acknowledgement information items, wherein the control channel information is provided from the upper node;

confirming regions allocated for unique IDentifiers (IDs) of the lower nodes based on the control channel information; and transmitting the plurality of acknowledgement information items to the upper node at the same time using regions confirmed in the control channel information and by allocating the plurality of acknowledgement information items to the regions allocated for the lower nodes.

2. The operating method of claim 1, wherein the upper node comprises a Base Station (BS) or an upper RS.

3. The operating method of claim 1, wherein one of the first lower node and the second lower node comprises a lower RS or a Mobile Station (MS).

4. The operating method of claim 1, wherein transmitting the plurality of acknowledgement information items to the upper node further comprises:

confirming data of the plurality of acknowledgement information items in response to the data reception;

confirming an order of the data carrying scheduling information from the upper node;

sequentially allocating the plurality of acknowledgement information items in response to the data reception of corresponding data to the regions confirmed in the control channel information according to the order of the data of the scheduling information; and transmitting the sequentially allocated plurality of acknowledgement information items to the upper node.

5. The operating method of claim 4, wherein the scheduling information comprises MAP information.

6. The operating method of claim 4, wherein:

transmitting the plurality of acknowledgement information items to the upper node further comprises confirming an information list of the plurality of acknowledgement information items in response to a data reception, wherein the plurality of acknowledgement information items are sent to the upper node according to a transmission time of the plurality of acknowledgement information items; and wherein sequentially allocating the plurality of acknowledgement information items comprises sequentially allocating the plurality of information of the information list among the plurality of acknowledgement information items received from the lower nodes, to the regions confirmed from the control channel information.

7. The operating method of claim 6, wherein the information list is provided from the upper node using broadcasting information or a separate control channel.

8. The operating method of claim 1, further comprising:

checking for errors in the first data, after receiving the first data;

checking for errors in the second data, after receiving the second data;

generating information in response to reception of the first data and the second data, wherein transmitting the plurality of acknowledgement information to the upper node comprises transmitting the generated information and the plurality of acknowledgement information items received from the lower nodes to the upper node at the same time, wherein transmitting the first data comprises transmitting the first data to the first lower node, when the first data has no errors, and wherein transmitting the second data comprises transmitting the second data to the second lower node, when the second data has no errors.

9. The operating method of claim 8, wherein transmitting the plurality of acknowledgement information items to the upper node comprises:

confirming control channel information for transmitting the plurality of acknowledgement information items, wherein the control channel information is provided from the upper node; and transmitting the generated information and the plurality of acknowledgement information items provided from the lower nodes to the upper node at the same time using regions of the confirmed control channel information.

10. The operating method of claim 9, wherein transmitting the plurality of acknowledgement information items to the upper node further comprises:

confirming data indicative of the error of the generated information and the plurality of acknowledgement information items provided from the lower nodes;

confirming an order of the data of scheduling information received from the upper node;

sequentially allocating the plurality of acknowledgement information items in response to a data reception to the regions confirmed from the control channel information according to the order of the data of the received scheduling information; and transmitting the sequentially allocated plurality of acknowledgement information items to the upper node.

11. The operating method of claim 10, wherein the scheduling information comprises MAP information.

12. An operating method of a Relay Station (RS) in a wireless relay communication system, the method comprising:

receiving first data from a first lower node;

transmitting the first data to an upper node;

receiving second data from a second lower node;

transmitting the second data to the upper node, in response to receipt of an uplink data from a lower node other than the at least one RS;

receiving a plurality of acknowledgement information items from at least one lower RS, transmitting the plurality of information to the upper node at a same time corresponding to a single transmission time frame, wherein each of the plurality of information items includes an Acknowledgement (ACK) or a Negative ACK (NACK), and wherein transmitting the plurality of acknowledgement information items to the upper node comprises:

confirming control channel information for transmitting the plurality of acknowledgement information items, wherein the control channel information is provided from the upper node;

confirming regions allocated for unique IDentifiers (IDs) of the lower nodes based on the control channel information and transmitting the plurality of acknowledgement information items to the upper node at the same time using regions confirmed in the control channel information and by allocating the plurality of acknowledgement information items to the regions allocated for the lower nodes.

13. The operating method of claim 12, wherein each of the first lower node and the second lower node comprises a lower RS or a Mobile Station (MS).

14. The operating method of claim 12, wherein the upper node comprises a Base Station (BS) or an upper RS.

15. The operating method of claim 12, wherein transmitting the plurality of acknowledgement information items to the upper node further comprises:
confirming data indicative of an error in the plurality of acknowledgement information items;
confirming an order of the data carrying scheduling information from the upper node;
sequentially allocating the plurality of acknowledgement information items indicative of the error of corresponding data to regions confirmed in the control channel information according to the order of the data carrying the scheduling information; and
transmitting the sequentially allocated plurality of acknowledgement information items to the upper node.

16. The operating method of claim 15, wherein the scheduling information comprises MAP information.

17. The operating method of claim 15, further comprising:
confirming an information list of information indicative of the error to be sent to the upper node according to a transmission time of the information,
wherein sequentially allocating the plurality of acknowledgement information items comprises sequentially allocating the information of the information list among the plurality of acknowledgement information items provided from the lower nodes, to the regions confirmed from the control channel information.

18. The operating method of claim 17, wherein the information list is received from the upper node using broadcasting information or a separate control channel.

19. The operating method of claim 12, further comprising:
checking for errors in the first data, after receiving the first data;
checking for errors in the second data, after receiving the second data;
generating information in response to reception of the first data and the second data,
wherein transmitting the plurality of acknowledgement information items to the upper node comprises transmitting the generated information and the plurality of acknowledgement information items received from the one or more lower nodes to the upper node at the same time,
wherein transmitting the first data comprises transmitting the first data to the upper node, when the first data has no errors, and
wherein transmitting the second data comprises transmitting the second data to the upper node, when the second data has no errors.

20. The operating method of claim 19, wherein transmitting the plurality of acknowledgement information items to the upper node further comprises:
confirming control channel information for transmitting the information, wherein the control channel information is provided from the upper node; and
transmitting the generated information and the plurality of acknowledgement information items provided from the lower nodes to the upper node at the same time using regions confirmed from the control channel information.

21. The operating method of claim 20, wherein transmitting the plurality of acknowledgement information items to the upper node comprises:
confirming data indicative of an error in the generated information and the plurality of acknowledgement information items provided from the lower nodes;
confirming an order of data carrying scheduling information from the upper node;
sequentially allocating the plurality of acknowledgement information items in response to the reception of data of the corresponding data to regions confirmed from the control channel information according to the order of the data carrying the scheduling information; and
transmitting the sequentially allocated plurality of acknowledgement information items to the upper node.

22. The operating method of claim 21, wherein the scheduling information comprises MAP information.

23. An operating method of an upper node in a wireless relay communication system, the method comprising:
allocating a control channel for receiving information in response to data transmitted to at least one lower node from a lower Relay Station (RS);
transmitting allocation information of the control channel to the lower RS; and
receiving a plurality of acknowledgement information items from the lower RS according to the allocation information at a same time corresponding to a single reception time frame,
wherein the plurality of acknowledgement information items is generated by the at least one lower node, in response to the receipt of data from the upper node,
wherein each of the plurality of information items includes an Acknowledgement (ACK) or a Negative ACK (NACK), and
wherein allocating the control channel comprises:
confirming unique IDentifiers (IDs) of the one or more lower nodes for receiving the information indicative of the error; and
allocating control channels for the information indicative of the error based on the unique IDs.

24. The operating method of claim 23, wherein the upper node comprises a Base Station (BS) or an upper RS.

25. The operating method of claim 23, wherein the lower node comprises a lower RS or a Mobile Station (MS).

26. The operating method of claim 23, wherein allocating the control channel comprises:
determining lower nodes from which the information indicative of the error are received;
transmitting information of the lower nodes to the lower RS; and
allocating control channels for receiving the information indicative of the errors of the lower nodes from the lower RS.

27. The operating method of claim 26, wherein allocating the control channel further comprises:
determining start point information and end point information of a region for receiving the information indicative of the error of the lower nodes from the lower RS.

28. A Relay Station (RS) in a wireless relay communication system, comprising:
a receiver for receiving first data and second data from an upper node; and
a transmitter for transmitting the first data to a first lower node, and for transmitting the second data to a second lower node,
wherein the receiver receives a plurality of acknowledgement information items from at least one of the first lower node and the second lower node, in response to receipt of at least one of the first data and the second data from the RS,
wherein the transmitter transmits the received plurality of acknowledgement information items to the upper node at a same time corresponding to a single transmission time frame, wherein each of the plurality of acknowledgement information comprises an Acknowledgement (ACK) or a Negative ACK (NACK), and wherein transmitting the plurality of acknowledgement information items to the upper node includes confirming control channel information for transmitting the plurality of acknowledgement information items, wherein the control channel information is provided from the upper node, confirming regions allocated for unique IDentifiers (IDs) of the lower nodes based on the control channel information, and transmitting the plurality of acknowledgement information items to the upper node at the same time using regions confirmed in the control channel information and by allocating the plurality of acknowledgement information items to the regions allocated for the lower nodes.

29. The RS of claim 28, wherein the upper node comprises a Base Station (BS) or an upper RS.

30. The RS of claim 28, wherein one of the first lower node and the second lower node comprises a lower RS or a Mobile Station (MS).

31. The RS of claim 28, further comprising:
a checker for checking for errors in the received first data and second data,
wherein the transmitter transmits data received from the upper node to one of the first a lower node and the second node when the data has no errors.

32. The RS of claim 28, wherein the receiver confirms control channel information for transmitting the plurality of acknowledgement information items provided from the upper node.

33. The RS of claim 32, wherein the transmitter transmits the plurality of acknowledgement information items, the information provided from the lower nodes, of the corresponding data to the upper node by sequentially allocating the plurality of acknowledgement information items to regions confirmed from the control channel information according to an order of data carrying scheduling information from the upper node.

34. The RS of claim 28, further comprising:
a checker for checking for errors in the received first data and second data; and
an information generator for generating an information indicative of errors of first data and second data confirmed at the checker,
wherein the transmitter transmits the generated information and the plurality of acknowledgement information items, the information provided from the lower nodes, to the upper node at the same time.

35. A Relay Station (RS) in a wireless relay communication system, comprising:
a receiver for receiving first data from a first lower node, and for receiving second data from a second lower node;
a transmitter for transmitting the first data and the second data to an upper node,
wherein, when a plurality of acknowledgement information items is received from at least one lower RS in response to receipt of uplink data from a lower node other than the at least one lower RS, the transmitter transmits the plurality of acknowledgement information items to the upper node at a same time corresponding to a single transmission time frame,
wherein each of the plurality of information comprises an Acknowledgement (ACK) or a Negative ACK (NACK), and
wherein transmitting the plurality of acknowledgement information items to the upper node includes confirming control channel information for transmitting the plurality of acknowledgement information items, wherein the control channel information is provided from the upper node, confirming regions allocated for unique IDentifiers (IDs) of the lower nodes based on the control channel information, and transmitting the plurality of acknowledgement information items to the upper node at the same time using regions confirmed in the control channel information and by allocating the plurality of acknowledgement information items to the regions allocated for the lower nodes.

36. The RS of claim 35, wherein the upper node comprises a Base Station (BS) or an upper RS.

37. The RS of claim 35, wherein one of the first lower node and the second lower node comprises a lower RS or a Mobile Station (MS).

38. The RS of claim 35, further comprising,
a checker for checking for errors in the received first data and second data,
wherein the transmitter transmits the first data to the upper node when the data has no errors, and transmits the second data to the upper node when the second data has no errors.

39. The RS of claim 35, wherein the receiver confirms control channel information for transmitting the plurality of information provided from the upper node.

40. The RS of claim 39, wherein the transmitter transmits the plurality of information in response to the reception of data from the second lower node of the corresponding data to the upper node by sequentially allocating the plurality of information to regions confirmed from the control channel information according to an order of data carrying scheduling information from the upper node.

41. The RS of claim 36, further comprising:
a checker for checking for errors in the received first data and second data; and
an information generator for generating an information indicative of errors of data confirmed at the checker,
wherein the transmitter transmits the generated information and the plurality of information, the information provided from the lower nodes, to the upper node at the same time.

42. An operating method of a Relay Station (RS) in a wireless relay communication system, the method comprising:
receiving a plurality of acknowledgement information items from at least one lower node, in response to reception of data from the RS; and
transmitting the received plurality of acknowledgment information items to an upper node at a same time corresponding to a single transmission time frame,
wherein each of the plurality of acknowledgement information items comprises an Acknowledgement (ACK) or a Negative ACK (NACK), and
wherein transmitting the plurality of acknowledgement information items to the upper node includes confirming control channel information for transmitting the plurality of acknowledgement information items, wherein the control channel information is provided from the upper node, confirming regions allocated for unique IDentifiers (IDs) of the lower nodes based on the control channel information, and transmitting the plurality of acknowledgement information items to the upper node at the same time using regions confirmed in the control channel information and by allocating the plurality of acknowledgement information items to the regions allocated for the lower nodes.

* * * * *